(12) United States Patent
Colby (10) Patent No.: US 6,758,317 B1
(45) Date of Patent: Jul. 6, 2004

(54) FIELD CROP HARVESTING AND LOADING VEHICLE

(76) Inventor: Edward K. Colby, P.O. Box 247, Oakview, CA (US) 93022

( * ) Notice: Subject to any disclaimer, the term of this patent is extended or adjusted under 35 U.S.C. 154(b) by 0 days.

(21) Appl. No.: 10/159,878

(22) Filed: May 29, 2002

Related U.S. Application Data (60) Provisional application No. 60/303,560, filed on Jul. 6, 2001.

(51) Int. Cl.[7] .............................................. B65G 21/10
(52) U.S. Cl. ...................... 198/312; 198/313; 56/15.1; 414/503; 414/508; 414/523
(58) Field of Search ............................... 198/312, 313; 414/508, 523, 503; 56/15.1

(56) References Cited

U.S. PATENT DOCUMENTS

| | | | | |
|---|---|---|---|---|
| 688,912 | A | * | 12/1901 | Watts .......................... 198/311 |
| 2,699,877 | A | * | 1/1955 | Huston ........................ 414/523 |
| 3,599,784 | A | * | 8/1971 | Rossi .......................... 198/311 |
| 3,724,168 | A | | 4/1973 | Cassady, Jr., et al. |
| 3,827,446 | A | | 8/1974 | Honeycutt |
| 4,292,784 | A | | 10/1981 | Abatti et al. |
| 4,411,581 | A | * | 10/1983 | Niewold ...................... 414/489 |
| 4,590,739 | A | | 5/1986 | Abatti et al. |
| 4,616,468 | A | | 10/1986 | Munoz |
| 4,655,667 | A | | 4/1987 | Plumb et al. |
| 4,736,574 | A | | 4/1988 | Walker |
| 4,899,527 | A | * | 2/1990 | van den Munckhof et al. .......................... 56/328.1 |
| 5,549,414 | A | * | 8/1996 | Boxall et al. ................ 404/101 |
| 6,029,431 | A | | 2/2000 | Dowler et al. |
| 6,070,402 | A | | 6/2000 | Korthuis et al. |
| 6,186,311 | B1 | * | 2/2001 | Conner ........................ 198/300 |

* cited by examiner

Primary Examiner—Joseph A. Dillon
(74) Attorney, Agent, or Firm—Ralph D. Chabot (57) ABSTRACT

A vehicle for the harvesting of plants bearing fruit or vegetables and particularly strawberries is disclosed. The vehicle comprises a conveyor belt system which is a pair of conveyors each comprising a belt assembly and an elongated trough positioned in a fixed relation above the belt assembly. Each conveyor is configured so that it can span many rows of fruit. Workers stand behind a conveyor and follow the vehicle picking strawberries. When the vehicle reaches the end of a row, the conveyor belt system is arc displaced over the vehicle to the opposite side using hydraulic power or some other appropriate means for displacement. The vehicle wheels are orientated for travel along the access road along the end of a field, for example, 90 degrees when the road is perpendicular to the rows of fruit. The vehicle then travels along the end of the field until it is again aligned with rows of fruit to be picked. The wheels are then orientated back for travel across the field.

16 Claims, 12 Drawing Sheets

FIELD CROP HARVESTING AND LOADING VEHICLE

PRIORITY CLAIM

Applicant claims the benefit of the provisional application bearing U.S. Ser. No. 60/303,560 filed Jul. 6, 2001.

TECHNICAL FIELD

This invention pertains to the field of vehicular devices, which assist in the harvesting, and palletizing of agricultural products.

BACKGROUND OF THE INVENTION

Vehicles for many years have been adapted and modified to assist in the harvesting of agricultural products. Even with the assistance of vehicles, harvesting of certain crops, particularly small and delicate fruit such as strawberries, are extremely labor intensive.

Strawberry harvesting requires the backbreaking work of many laborers. Boxes, referred to as flats, are used for collection of the fruit. For a typical strawberry field, workers will carry the empty flats and harvest the strawberries by hand, placing the gathered fruit into these flats. When filled, each flat is typically carried to the edge of the field where they are palletized with other flats. The carrying of filled flats is extremely inefficient; particularly when the flat is filled near the middle of a field. A worker must carry the flat, sometimes in muddy conditions, to the end of the field and then return to continue picking fruit. Studies have shown that lost time attributed to carrying loaded flats to the end of a field for palletizing can reach 30%.

Once palletized, the strawberry flats are then transported to a facility for refrigeration. Prior to wholesale distribution, it is a typical industry practice to cool the freshly picked fruit to about a temperature of 35 degrees F. To obtain this fruit temperature, strawberries harvested at 70 degrees F will require approximately 3 hours to cool while strawberries harvested at 50 degrees F require only 20 minutes.

The harvest season for strawberries can last approximately 6 months. It is typical industry practice to reinspect the strawberry plants every three days and harvest the ripened fruit.

As stated earlier, various vehicular designs have been used in the prior art to assist laborers for harvesting fruit. One of these prior art designs was disclosed in U.S. Pat. No. 4,292,784 issued to Abatti et. al. Abatti et. al. teaches a vehicle which utilizes a pair of conveyors which can span many rows of plants. The vehicle was designed for harvesting large produce such as watermelons.

One problem associated with vehicles utilizing elongated conveyors is that the turning radius of the vehicle is the wingspan of at least one of the conveyors. When the vehicle reaches the end of a row, the field must have sufficient clearance to permit the vehicle to be turned 180 degrees and aligned with rows next to be harvested. The increased turning radius of the vehicle can be a problem; especially if used in fields having space limitations. If insufficient space is available, the vehicle can not be turned without first removing or disconnecting at least one of the conveyors. Although it is possible to implement, this would be an extremely inefficient use of time.

SUMMARY OF THE INVENTION

My invention comprises a self-powered vehicle in which all vital functions are preferably hydraulically operated. The vehicle incorporates the use of a pair of rotating or displacement arms located on opposite sides and operably connected to the vehicle body; the operation of which will be discussed shortly. Connected to and supported by each arm is a respective conveyor the length of which is preferably from the edge of the vehicle along the front or rear of the vehicle to its midpoint.

The vehicle tires can be rotated into any orientation upon the horizontal plane. Therefore, terminology such as front and rear will be limited. The rear of the vehicle describes the side of the vehicle facing the conveyors when they are in harvesting position as will be discussed shortly. The front will be the side opposite from the rear.

The two conveyors comprise a conveyor belt system. Each conveyor is comprised of a conveyor belt and associated assembly. The conveyor belt assembly essentially runs the entire length of each conveyor and comprises the rotating belt and hydraulically operated belt drive. Preferably, each conveyor includes an elongated trough top portion positioned above the lower conveyor belt and associated assembly. The top and lower portions are spaced apart from one another and supported by metal framing. The vertical spacing is necessary so that a flat filled with strawberries and preferably two flats stacked upon one another can be positioned upon the conveyor belt and not contact the bottom side of the trough.

The troughs however, do not span the entire length of each conveyor, specifically near the midpoint of the vehicle adjacent to the other conveyor. This is so that workers on the vehicle can lift the filled flats vertically off the conveyor belt without interference from the trough. The unloading procedure will be discussed in greater detail below.

The frame construction of each conveyor can be of any suitable metal such as high strength aluminum, fiberglass, etc. Preferably, the conveyor framing is constructed of steel.

The conveyor belt on each conveyor operates so that any flat positioned on it will be transported towards the rear midpoint of the vehicle. The adjacent ends of each conveyor are also bolted to one another to provide additional structural stability.

In the preferred embodiment, the conveyor belt system incorporates a pair of wing conveyors which are operatively connected to the distal ends of a respective conveyor that essentially extends the wing-span of the conveyor belt system. The wing conveyors are configured similar to the conveyors in that they comprise a top trough and conveyor belt assembly and similar vertical spacing there between.

Therefore, as used in this specification, the conveyor belt system comprises two conveyors so that their respective conveyor belt assemblies rotate in a direction to deliver objects placed upon it toward the other conveyor. In the preferred embodiment, the conveyor belt system also includes a pair of wing conveyors.

When a wing conveyor is desired for use, it is attached to and operatively connected to an adjacent conveyor, so that its belt assembly will rotate in the same direction. The conveyor belt system can span many rows of plants on either side of the vehicle.

As discussed earlier, each conveyor preferably comprises an elongated trough located above each conveyor belt assembly which is sized to hold empty boxes or flats. Most preferably, the trough is sized to hold a single row of empty flats so that bridging can be avoided. The adjacent ends of the conveyor and wing conveyor are essentially on the same plane or level so that empty flats can be slid with ease from the conveyor trough to the wing conveyor trough and filled flats can travel on the wing conveyor and then pass onto the adjacent conveyor toward the rear midpoint of the vehicle.

The rotating arms mentioned earlier serve an important function. Each arm is designed to work in tandem with the other arm and displace the conveyor belt system (i.e. wing-conveyor/conveyor/conveyor/wing-conveyor) from a horizontal loading position on one side of the vehicle, along an arc path over the vehicle to a second loading position located on the opposite side of the vehicle.

Since the conveyor system is substantially arc displaced 180 degrees over the vehicle, in order to maintain the orientation of the elongated trough above the conveyor belts, a leveling means is employed to maintain proper orientation. The leveling means comprises an electronic level switch which is operatively connected to a hydraulically powered rotary actuator that maintains the desired orientation. Preferably, in order to facilitate a smooth displacement of the conveyor belt system by the pair of rotating arms, the frame of each conveyor which is adjacent to one another, is physically connected to one another.

The vehicle is also equipped with a hydraulic powered rotary actuator operatively coupled to each tire which permits the vehicle's tires to be orientated in different directions along the horizontal plane. This feature, combined with the function of the rotating arms, eliminates the need for maximum clearance along the edge of a field to facilitate the turning of the vehicle, since the main body of the vehicle is not required to turn while harvesting a field.

The vehicle is self-powered. Either gasoline or propane can be used as the fuel source with the appropriate selected engine. However, it is preferred that the unit be diesel powered. A 60 hp diesel engine is sufficient to deliver the necessary power. The diesel engine powers all critical functions via the use of a hydraulic system. A control consol is located on one of the two work platforms or areas and preferably controls all vehicular functions. The platforms are preferably a grating surface made of fiberglass, high strength aluminum or other material not prone to rusting.

The diesel fuel and hydraulic oil supply are located in separate tanks typically within easy reach of the vehicle operator.

Hydraulics is the preferred means for performing all vehicular functions including displacement of the rotating arms; operation of the conveyor belts; rotation of the tires; displacement of the vehicle; and, operation of the pallet conveyor.

The vehicle, being specifically designed for operation in agricultural fields, has a limited maximum velocity. Preferably, velocity is limited to 1.5 miles per hour. A reduced maximum speed is desired for safety purposes.

Although the vehicle can travel on roadways much like other farm vehicles, when it is necessary that the vehicle be moved to a distant location, the vehicle can be loaded onto a flatbed truck for transportation. The vehicle design allows for a reduced profile as well as quick and easy removal of the tires. With the tires removed, the vehicle can then be lifted onto a flatbed by a crane or alternative lifting means.

As mentioned earlier, the tires can be orientated to a different horizontal ground engaging orientation by a respective rotary actuator. In my preferred embodiment, there are two modes for controlling wheel orientation: "field mode" and "road mode".

From the control panel, the wheels are controlled using one or both of the joysticks provided. In "field mode", one joystick controls the orientation of all four tires. For this mode, there is an additional control to adjust the hydraulics for tires on one side of the vehicle in order to maintain the vehicle in a straight path across the field. In "road mode", each joystick controls a separate pair of tires and typically only one joystick is used to drive the vehicle along a roadway.

In practice, once my vehicle completes travel from one end of a field to the other, its wheels are typically rotated 90 degrees and the rotating arms displace the conveyor belt system from the rear to the front which now becomes the rear. The vehicle travels a distance along the edge of the field until the span of the conveyor belt system typically span adjacent rows of fruit which have not yet been inspected. The wheels are then orientated for travel across the field. Once the vehicle enters the field, the workers walk behind the vehicle, inspecting the plants and picking the ripened fruit, filling the empty flats provided on the trough, and placing the filled flats on an adjacent conveyor belt.

The order of operation is not critical. At the end of the field, the tires can be orientated first and the vehicle displaced, or the conveyor system can be arc-displaced before the wheels are orientated. All that matters is that the conveyor system be behind the vehicle before traversing back across the field.

The vehicular design and particularly the framing design of the conveyors and wing conveyors permit the removable placement of shelves on the outward facing side of the conveyor frame. These shelves provide an aid to fruit pickers so that an empty flat may be placed upon the shelf and, the picker, walking behind the conveyor and shelf, can pick ripened fruit and place into the flat supported by the shelf. Once filled, the picker simply places the filled flat onto the conveyor belt. When at the end of the field and the conveyors are about to be rotated to the other side of the vehicle, the picker simply removes the shelf, waits for the rotating arms to position the conveyor belt system on the other side of the vehicle and places the shelf back into a desired position on the conveyor frame as the vehicle begins it travel back across the field.

Although designed for the harvesting of strawberries, my invention can be adapted for the harvesting of other small fruits and vegetables which are field crops.

Conveyor/Wing-Conveyor Attachment

There are a variety of means for physically connecting a wing conveyor to a conveyor. Each physical connection also typically requires an operative connection for operating the wing conveyor belt assembly. The preferred means for operating each conveyor belt assembly is by hydraulics so the operative connection would be the use of quick-connect couplings for the connection of hydraulic hoses on the wing conveyor to respective hoses located on the adjacent conveyor. Alternatively, the operative connection could be electronic if that was the means by which the conveyor belts would be operated.

The preferred physical connecting means is by a latch and pin engagement whereby the wing conveyor is lifted by a number of workers, positioned alongside the end of a respective conveyor and then lowered so that the pin and latch operatively engage one another. Once engaged, the wing conveyor is supported by the adjacent conveyor.

The wing conveyors can be removed from attachment to the adjacent conveyor once the power couplings are disconnected. However, removal should only be done when the vehicle is being prepared for transport to another field. Once removed, the wing conveyors can either be slid upon the pallet conveyor area of the vehicle or they can be carried to and placed upon a separate vehicle for transport.

Alternatively, the wing conveyors can be hingedly attached to a respective conveyor. For this embodiment, the wing conveyor is swung outwards about the hinge connection and into operative position. A locking device such as a lock bolt is used to maintain the wing conveyor position relative to the conveyor for the harvesting operation.

The vehicle has a central area substantially spanning the width of the vehicle body termed the pallet conveyor. On either side are work platforms. Preferably, each work platform has a stationary section and a displaceable or partially foldable section which is hinged to the stationary section. The length of the stationary section away from the pallet conveyor area is substantially equivalent to the distance of the adjacent tires away from the pallet conveyor area. The displaceable sections, when in their working configuration, provide a larger working area on the vehicle. During transport, these sections can be partially folded upward along their hinges, thereby reducing the overall width of the vehicle. This compliments the removal of tires to reduce the overall profile of the vehicle for easy transport and handling to a distant location.

As mentioned earlier, the conveyor belt system can be arc displaced from one side of the vehicle to the opposite side and visa versa. Displacement is accomplished preferably by using hydraulics although other power means such as electrical can be used to achieve displacement. As the conveyor belt system is displaced, the trough sections maintain their upright orientation above the conveyor belts. Therefore, physical and hydraulic disconnections are not necessary. This is a unique feature of my invention which facilitates a more time efficient operation.

Harvesting Operation

The harvest vehicle is positioned so that the conveyor belt system (i.e. two conveyors and their respective associated wing conveyors) substantially span rows of strawberries to be picked. As the vehicle travels slowly from one end of the field to the other, workers standing behind the vehicle and conveyors, pick the ripened fruit as they follow.

When a flat is filled with fruit, rather than carrying the flat to the edge of the field, the worker simply places the flat onto an adjacent conveyor belt, which transports the flat to a position adjacent a work area upon the vehicle. The worker next retrieves an empty flat from the trough, which is located above the conveyor belt and within easy reach of the worker.

Workers on the platform remove the filled flats from the conveyor. They are also responsible for ensuring that each trough is filled with empty flats. They accomplish this by periodically adding empty flats to the trough adjacent to the work area and pushing the flats until they are aligned side by side.

Workers on the platform also inspect the flats to insure that the quantity and appearance of the fruit is acceptable. A table is provided on each platform to facilitate this procedure. The flats are then positioned on pallets located on a central conveyor, referred to here as the pallet conveyor.

The pallet conveyor spans the width of the vehicle in parallel relation to conveyor belt system. The pallet conveyor can itself be another belt conveyor similar to that used for the conveyor belt system. However, more preferable, is the use of a pair of parallel looped chains spaced apart from one another and where the chain height is above the floor height. Therefore, pallets rest upon the pair of parallel chains.

The pallet conveyor is used to move pallets having filled flats of strawberries into position for removal from the vehicle. The pallet conveyor can be operated in either direction so that pallets can be loaded or removed from either side of the vehicle. Initially, pallets are loaded by forklift or the like onto the pallet conveyor. Empty flats can also be loaded onto the vehicle in similar fashion. To unload pallets of fruit from the vehicle, the pallet conveyor would be displaced until the filled pallet is near the edge of the vehicle so it can be easily removed by a forklift or direct transfer to a flatbed truck positioned adjacent.

An alternative embodiment can incorporate the use of an electronic eye positioned across the surface of the conveyor near the vehicle's edge and which would terminate the conveyor's operation every time a pallet or other object is recognized.

The vehicle also comprises a second work area located on the opposite side of the pallet conveyor. This second work area is essentially a duplicate of the first work area and is used when the vehicle travels in the opposite or reverse direction.

Vehicle Adjustments

When the vehicle is at the end of a row, its tires can be rotated 90 degrees or to any other desired horizontal orientation, and the vehicle can travel along the edge of the field a distance with the new tire orientation until it is aligned with other rows of fruit to be inspected. The wheels are then rotated back to their original orientation and the wing conveyors are arc displaced to the opposite side.

In this way, the turning radius of the vehicle becomes irrelevant since the vehicle's orientation relative to the field does not change. What changes is the tire orientation for aligning the vehicle with different rows of fruit and the displacement of the wing conveyors by the rotating arms from one side to the other.

The vehicle is preferably designed so that the tire spacing can be adjusted. Tire adjustment permits the vehicle to adapt for operation in various fields having different row spacing.

When the vehicle reaches the end of the row, the tires will be rotated as necessary so that the vehicle can travel along the edge of the field. The vehicle will typically travel a sufficient distance so that unpicked rows of fruit are within the wingspan of the conveyor sections. The conveyor belt system is arc displaced over the vehicle by the pair of rotating arms so that the conveyor belt system is now behind the vehicle for its travel back across the field. The workers on the vehicle, previously working on one platform, now move across the pallet conveyor and onto the other platform. The vehicle then proceeds in the reverse direction and the picking procedure is the same as described earlier.

Alternative Designs

An alternative embodiment of this vehicle can include a second conveyor belt system located on the side opposite the first. Instead of displacing the conveyor belt system from one side to the other as described above, no displacement is necessary. The drawbacks for incorporating a second conveyor belt system are the additional cost and weight.

Still another embodiment would eliminate the top trough section from the conveyor belt system. For this embodiment, the leveling means previously described would not be necessary.

Night-time Operation

Because of the wingspan of the conveyor belt system, workers can gather fruit behind the vehicle over an area spanning many rows. This aspect can be advantageous and permits the possibility of conducting harvesting operations at night. By operatively mounting a series of floodlights on the vehicle, the workers, who are harvesting in close proximity to the vehicle, can pick the ripened fruit at night and in cooler conditions. Preferably, the ideal position for a series of floodlights would be on a boom anchored to the vehicle so that the boom could extend over and beyond the conveyor system so illumination of the fruit can occur without the conveyor system casting a shadow upon the area of fruit to be harvested.

A number of advantages are realized by operating at night. Because the ambient temperature is cooler, workers are less prone to heat exhaustion. Additionally, the harvested fruit will have a lower temperature than the fruit picked during daylight hours. This is important when taking refrigeration costs into account. Nighttime picked fruit will require less refrigeration time to cool to the desired shipping temperature as mentioned earlier. Fruit can therefore be shipped faster. Nighttime harvesting also permits 24 hours a day harvesting, allowing the vehicle to cover more acreage than if it only operated during daylight.

DETAILED DESCRIPTION OF THE PREFERRED EMBODIMENT

Figure 1:
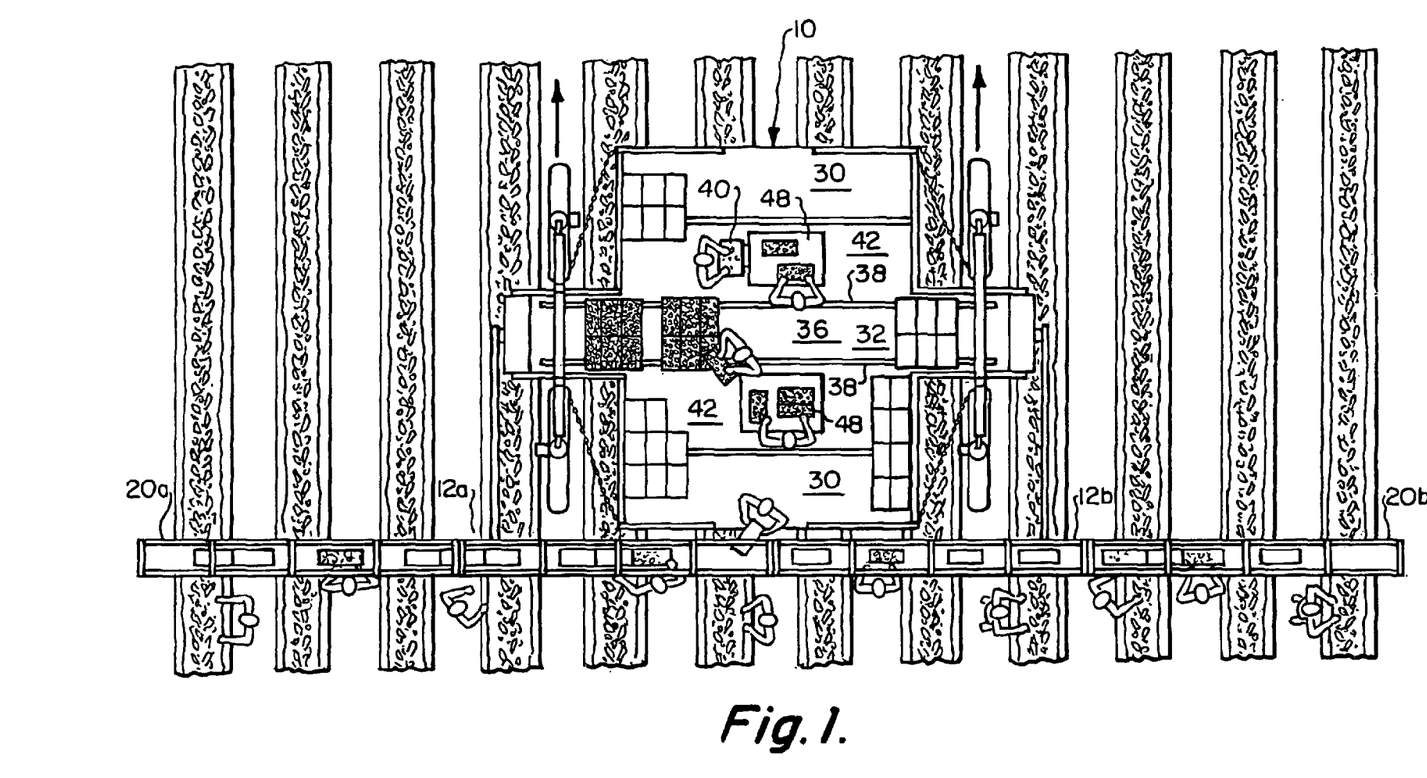
FIG. 1 is an overhead view illustrating the unit traveling through a field with workers harvesting fruit.

FIG. 1 illustrates the operation of harvester unit 10 in a field. A number of laborers can work upon the main body of unit 10. The main body is defined to include the foldable work platform areas 30, stationary work areas 42, and central area 36. Located on one of stationary areas 42 is control panel 40 from which an operator can control all vehicular functions.

Figure 4:
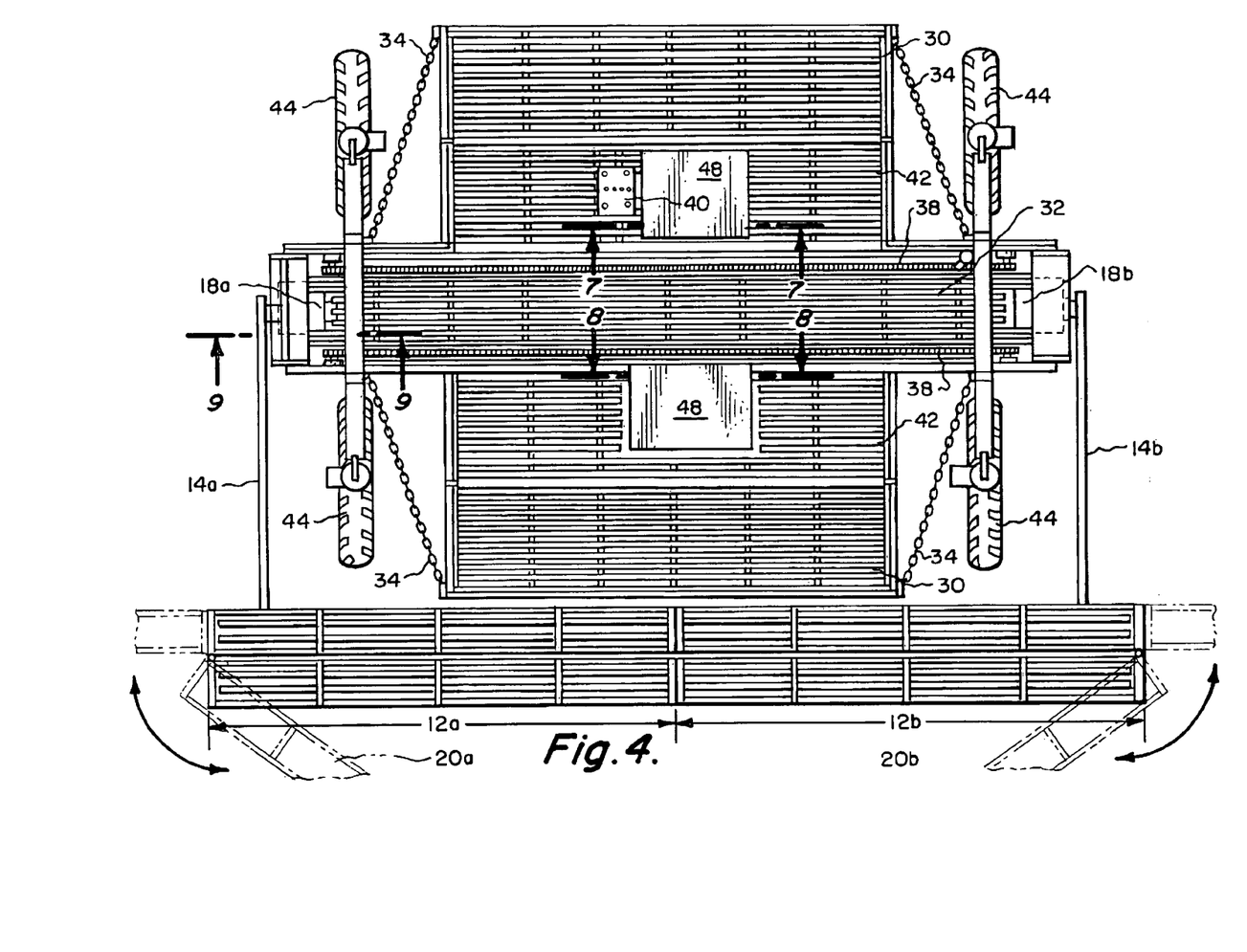
FIG. 4 is a top view of my unit illustrating one means for extending the wing conveyors to respective conveyors.
Figure 7:
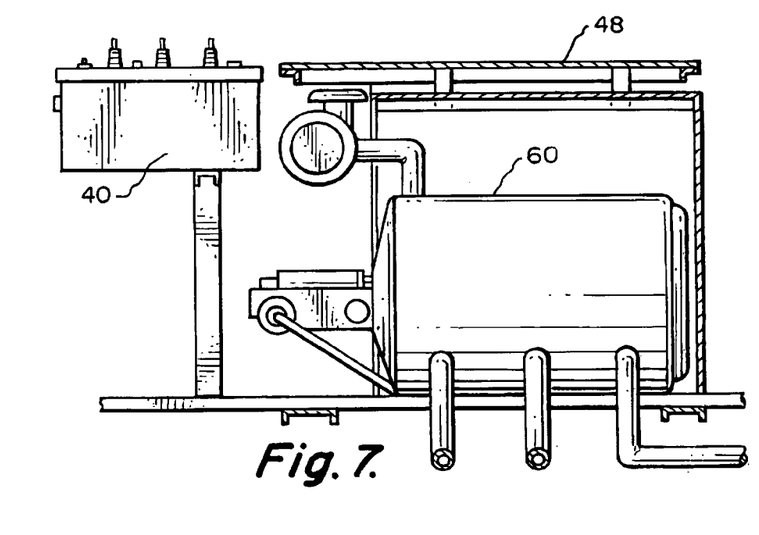
FIG. 7 is a view taken along line 7—7 of FIG. 4.
Figure 8:
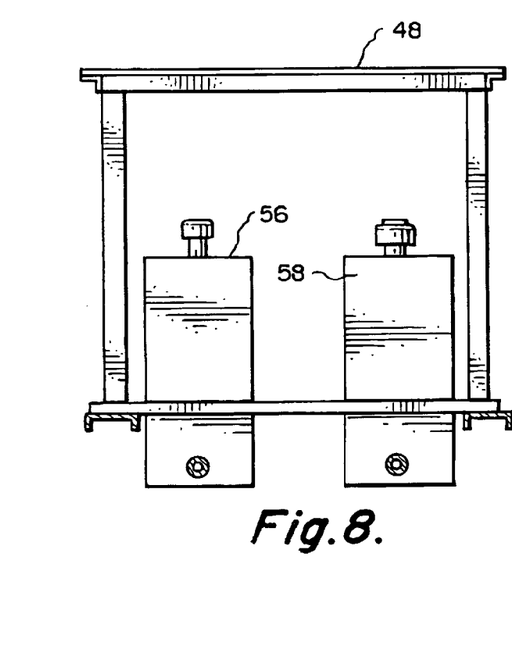
FIG. 8 is a view taken along line 8—8 of FIG. 4.

FIGS. 4, 7, and 8 illustrate the positioning beneath tables 48 of hydraulic oil tank 56, fuel tank 58 and engine 60.

Figure 2:
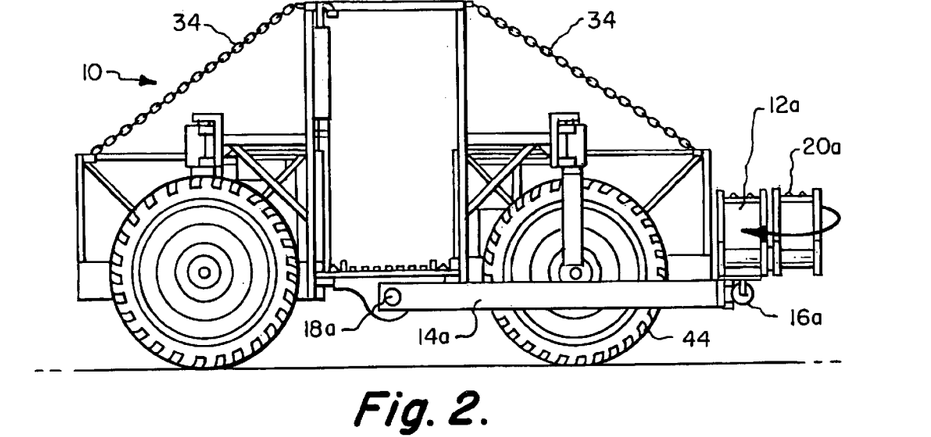
FIG. 2 is a first side view.

FIG. 2 is a side view of harvester unit 10 illustrating its appearance between transport and harvesting configurations incorporating hinge connection embodiment of the wing conveyor 20a to conveyor 12a. Harvester unit 10 carries its own power supply and drive mechanism so that it can travel between locations on its own. Before describing the transport and harvesting configurations in detail, the following paragraphs will describe the connectivity of the parts to one another.

Figure 3:
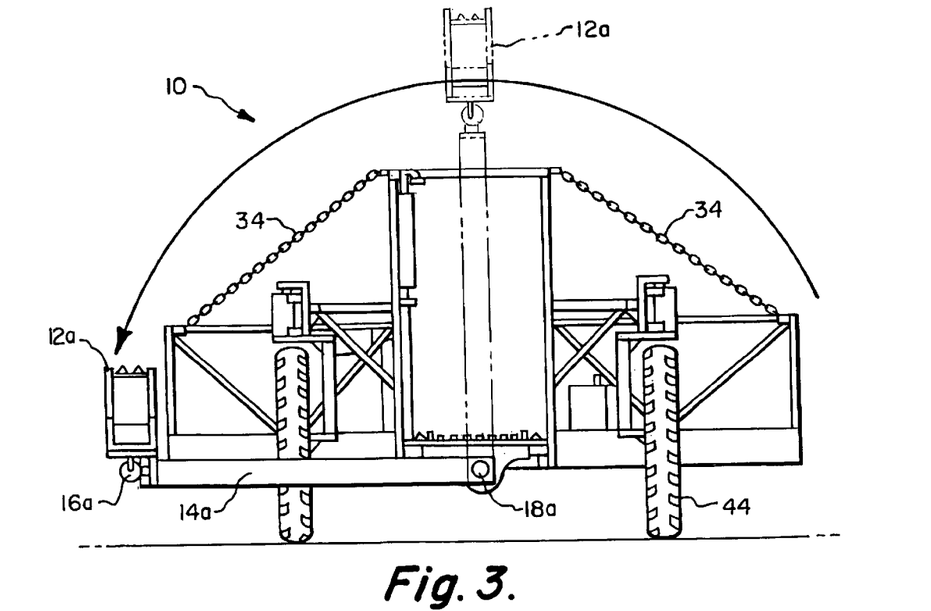
FIG. 3 is a second side view of my invention illustrating the conveyor belt changing position from one side of the vehicle to the opposite side and also showing the wheels orientated 90 degrees from FIG. 1.
Figure 5:
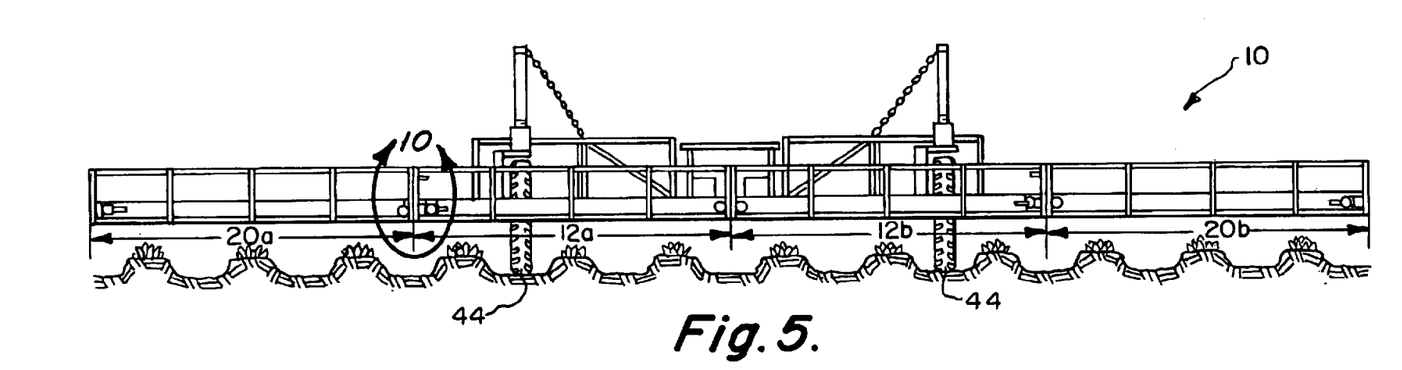
FIG. 5 is a rear view with the wing conveyors in extended position.
Figure 6:
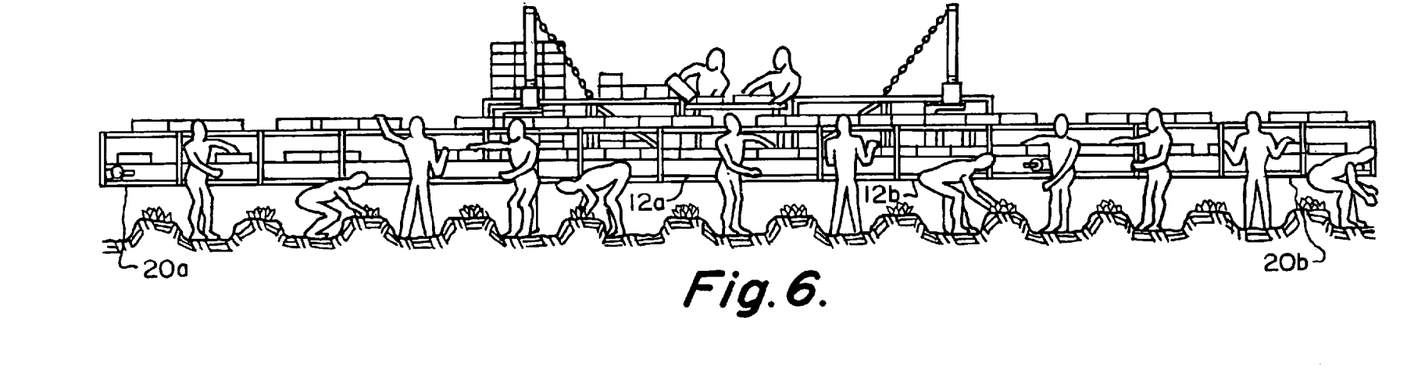
FIG. 6 is FIG. 5 depicted in operation.

FIGS. 5 and 6 display a rear view of the harvester unit 10 having conveyors 12a and 12b. Conveyors 12a and 12b are connected to respective rotating arms 14a and 14b as seen in FIG. 4. Referring to FIG. 3, operatively connected to a respective set of conveyors and rotating arms is a hydraulic leveling device with level sensor 16a and 16b. Each rotating arm is operatively connected to the vehicle body by connection to a hydraulic rotating device 18a and 18b respectively. Also connected to conveyors 12a and 12b are wing conveyors 20a and 20b respectively.

Figure 10:
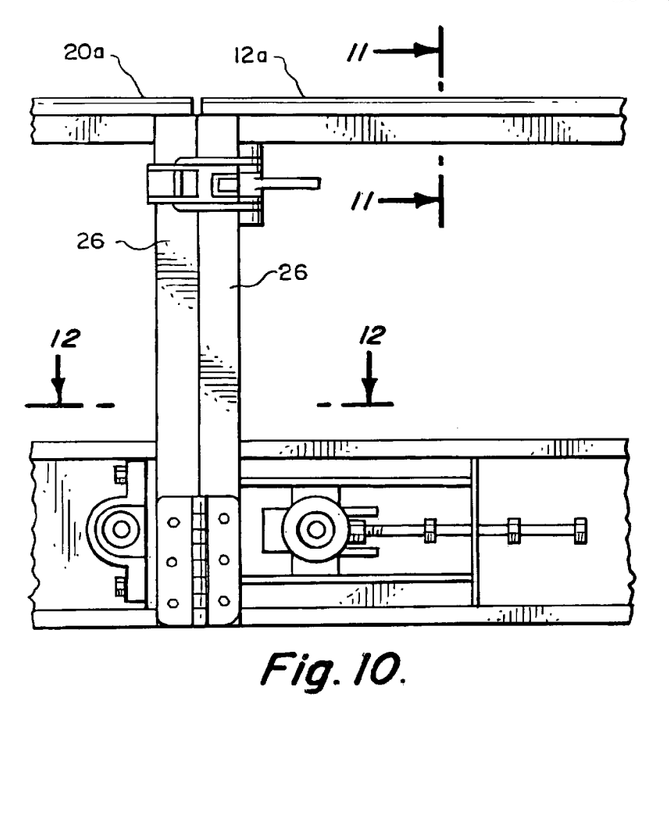
FIG. 10 illustrates a first alternative embodiment for extension of the wing conveyors utilizing a hinging means.
Figure 11:
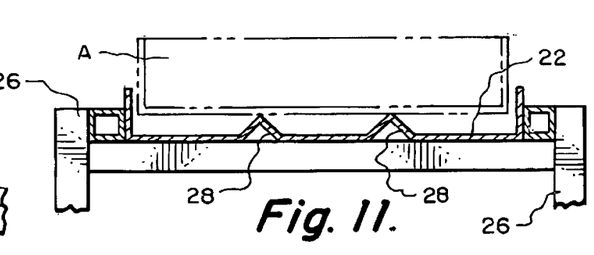
FIG. 11 is a view of FIG. 10 taken along line 11—11 and illustrates the position of a flat upon a tray chute.
Figure 12:
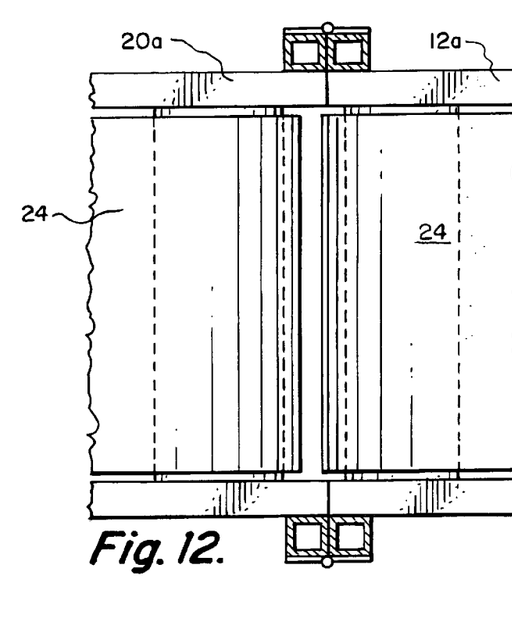
FIG. 12 is a view of FIG. 10 taken along line 12—12 and illustrates the operational relationship of the wing conveyor belt to the corresponding adjacent vehicle conveyor belt.

Each of the conveyors 12 and wing conveyors 20, comprise the following sections which are illustrated in FIGS. 10, 11, and 12. Each conveyor has an upper elongated trough section 22 and a lower rotating belt section 24 connected to one another by vertical supports 26. Power couplings (not shown) provide the power for belt section 24 on wing conveyors 20a and 20b.

Referring to FIG. 11, trough section 22 preferably includes a pair of longitudinally extending chevrons 28 which are used to minimize the contact surface area with an empty flat "A" placed into the trough. This design reduces friction; allowing multiple empty flats to be displaced along trough 22 with minimal force.

Figure 14:
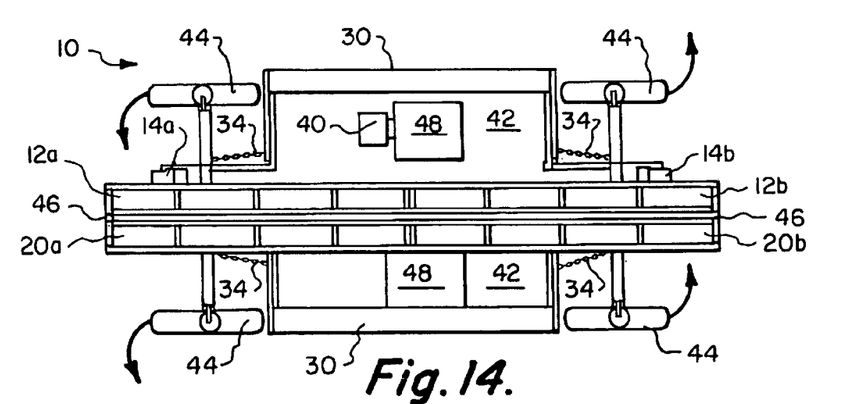
FIG. 14 is a top view of the unit with the work platforms folded and indicating the direction to orient the wheels prior to harvesting operations.

FIGS. 4 and 14, illustrate a work platform section 42 on either side of pallet conveyor section 32. Each work platform section 42 is preferably connected to a foldable platform extension 30 along one or more hinges. Each foldable platform 30 serves two purposes. The first is that width profile of the unit 10 is minimized for travel along a commercial road when platforms 30 are in their folded position. The second purpose is to maximize the available space for the laborers working upon unit 10 during harvesting operations. To facilitate the folding procedure, chains 34 can be used to lift the distal ends of platform sections 30 using a winch or the like. Alternatively, one or more laborers standing on the ground surface can push the underside of platform 30 closest to them upward into the folded position.

Pallet conveyor section 32 comprises a stationary elongated central area 36 which has a pair of cooperatively operating displacement chains 38 located on opposing sides of the central area 36 adjacent to the stationary work stations 42.

Figure 9:
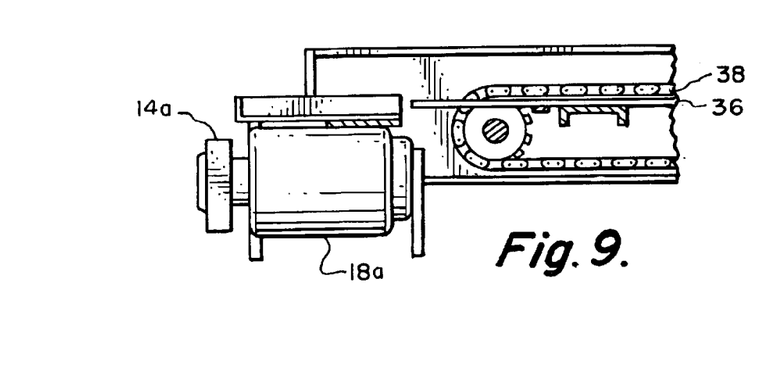
FIG. 9 is a view taken along line 9—9 of FIG. 4.

As best depicted in FIG. 9, chains 38 are elevated above the surface of central area 36 and adjacent sections 42. The pair of displacement chains 38 function as a conveyor belt for pallets and can travel in a forward or reverse direction. The width of pallet conveyor section 32 is designed so that pallets can be placed upon it and be supported by a portion of each of the displacement chains 38 so that no part of any pallet should substantially contact central area 36. Movement of displacement chains 38 are hydraulically controlled from control panel 40. Any pallets placed upon chains 38 can be displaced along pallet conveyor section 32 as desired.

Transport Configuration

Figure 13:
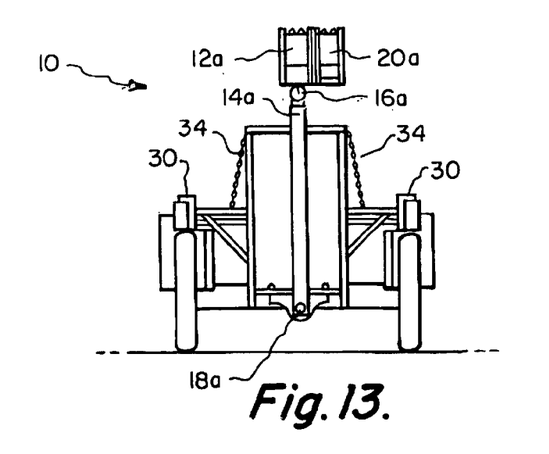
FIG. 13 illustrates a unit in transit with work platforms folded and conveyor belts in a raised position.

FIG. 13 and FIG. 14 illustrate unit 10 in the transport configuration suitable for travel on roadways. Rotating arms 14a and 14b suspend conveyors 12a and 12b. Wing conveyors 20a and 20b can also be suspended by their attachment to conveyors 12a and 12b. However, in an embodiment where wing conveyors 20a and 20b are not hinged to respective conveyors 12a and 12b, each can be disconnected and either placed upon unit 10 or transported separately as will be described later. In the transport configuration, foldable work platform sections 30 are in their folded position.

Harvesting Configuration

Figure 15:
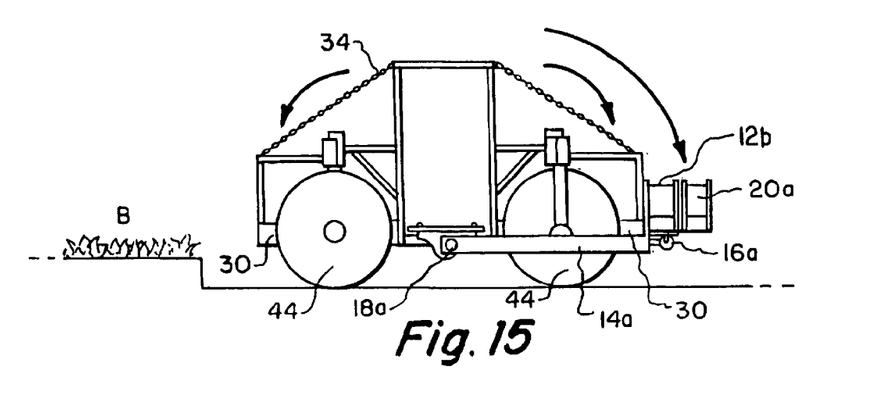
FIG. 15 is the unit depicted in FIG. 13 illustrating the work platform unfolded and the tires rotated for harvesting operation.
Figure 16:
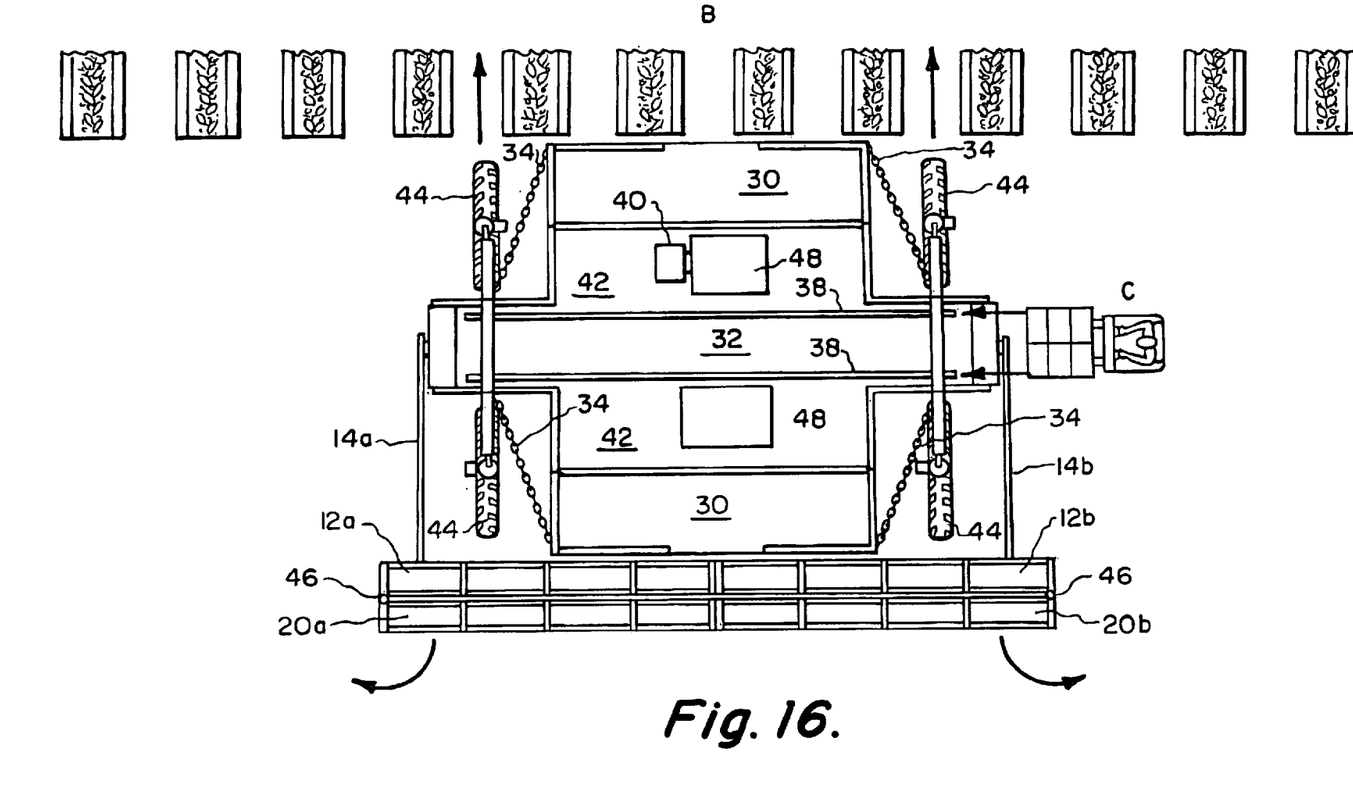
FIG. 16 is an overhead view of the unit positioned at the edge of a field and illustrating the direction for extending the wing conveyors and the stacking of empty pallets with a forklift.

Prior to beginning the harvesting operation, unit 10 is positioned for movement across a field B as shown in FIGS. 15 and 16. Foldable platform sections 30 are lowered into a substantially horizontal operating position and the tires 44 are hydraulically orientated for travel across the field B.

Figure 21:
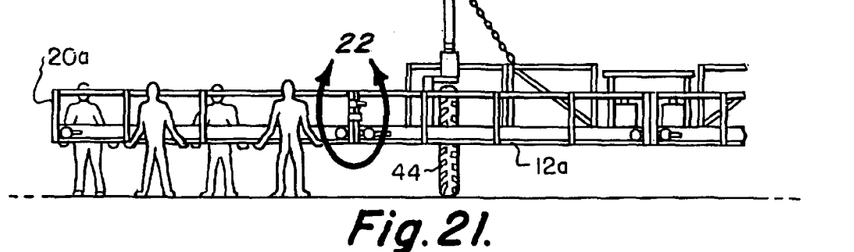
FIG. 21 illustrates the preferred embodiment for extending a wing conveyor.
Figure 22:
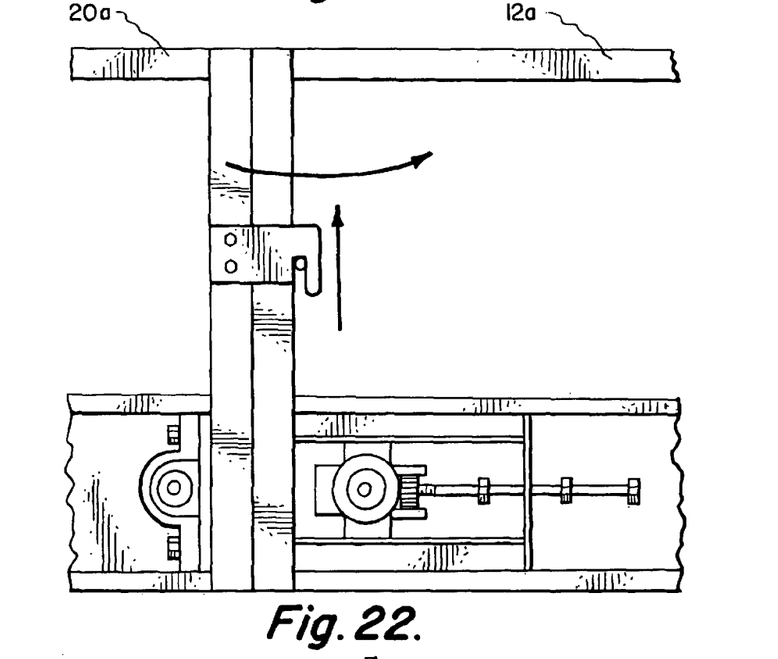
FIG. 22 is a view of 22 of FIG. 21.
Figure 23:
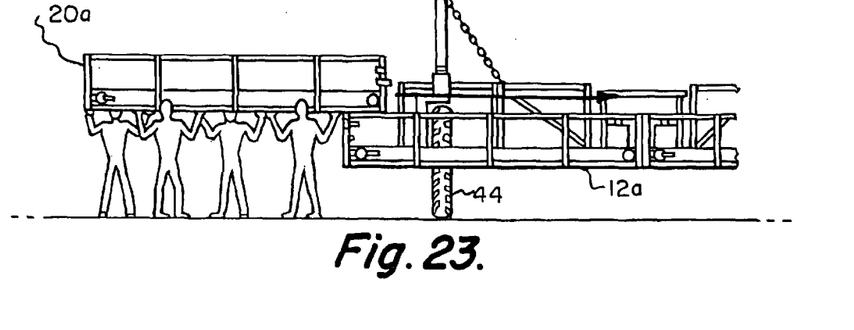
FIG. 23 illustrates disconnecting a wing conveyor and placement upon unit for transport.

In one embodiment, the conveyor/wing-conveyor connection is by hinges 46 best shown in FIG. 16. However, another and more preferred embodiment for this connection is shown by FIGS. 21, 22, and 23. Rather than using a hinge, the connection means comprises a slot and pin arrangement is used where a number of workers will position each wing conveyor 20 above the connection means and then lower until the connection means will support wing conveyor. This connection can be in an "L" or "J" type slot, but any other similar configuration is acceptable.

FIGS. 22 and 23 show the disassembly procedure. Wing conveyor 20a is lifted off the slot and pin connection means and thereafter slid onto central area 36 for transport.

Returning to the description of the harvesting operation, an operator can load pallets and empty flats onto unit 10 by use of a forklift shown as C in FIG. 16. Once wing conveyors 20a and 20b are in their operational position extending away from conveyors 12a and 12b, unit 10 travels across the field as generally depicted in FIG. 1. As the harvesters fill a flat, they place them onto the adjacent conveyor belt which carries the filled flat to a point adjacent to one of the foldable platforms 30. Workers onboard unit 10 then remove the filled flats, and load them onto pallets at area 36. Tables 48 are provided for uses such as inspection of fruit which may be necessary from time to time prior to palletizing the fruit.

Figure 18:
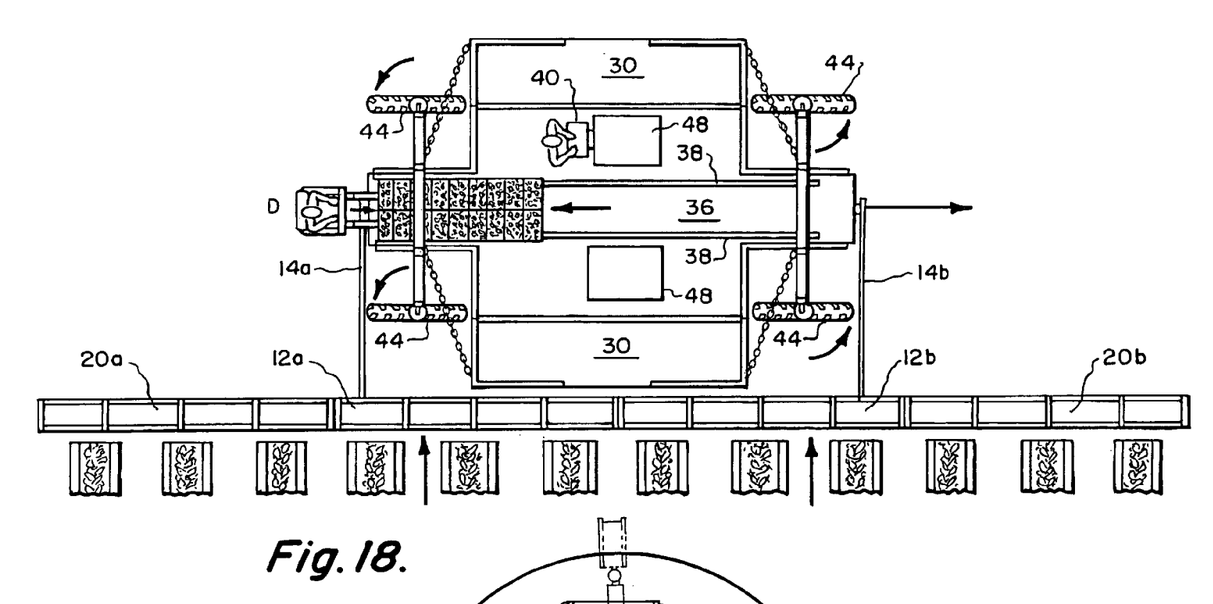
FIG. 18 illustrates the vehicle having completely traveled across a field, rotating tires for traveling along the edge of a field and removal of loaded pallets from the unit by a forklift.
Figure 19:
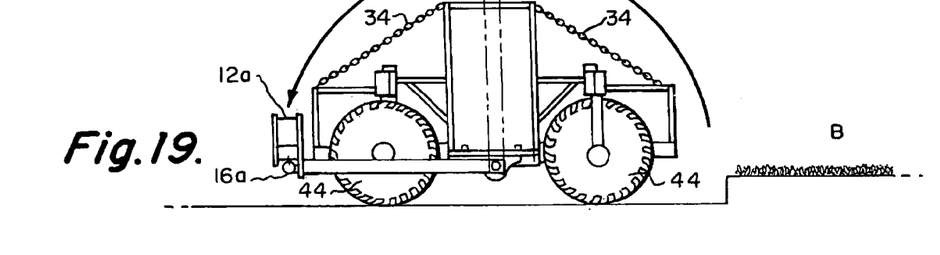
FIG. 19 illustrates the movement of the wing conveyors relative to the main body of the unit.????
Figure 20:
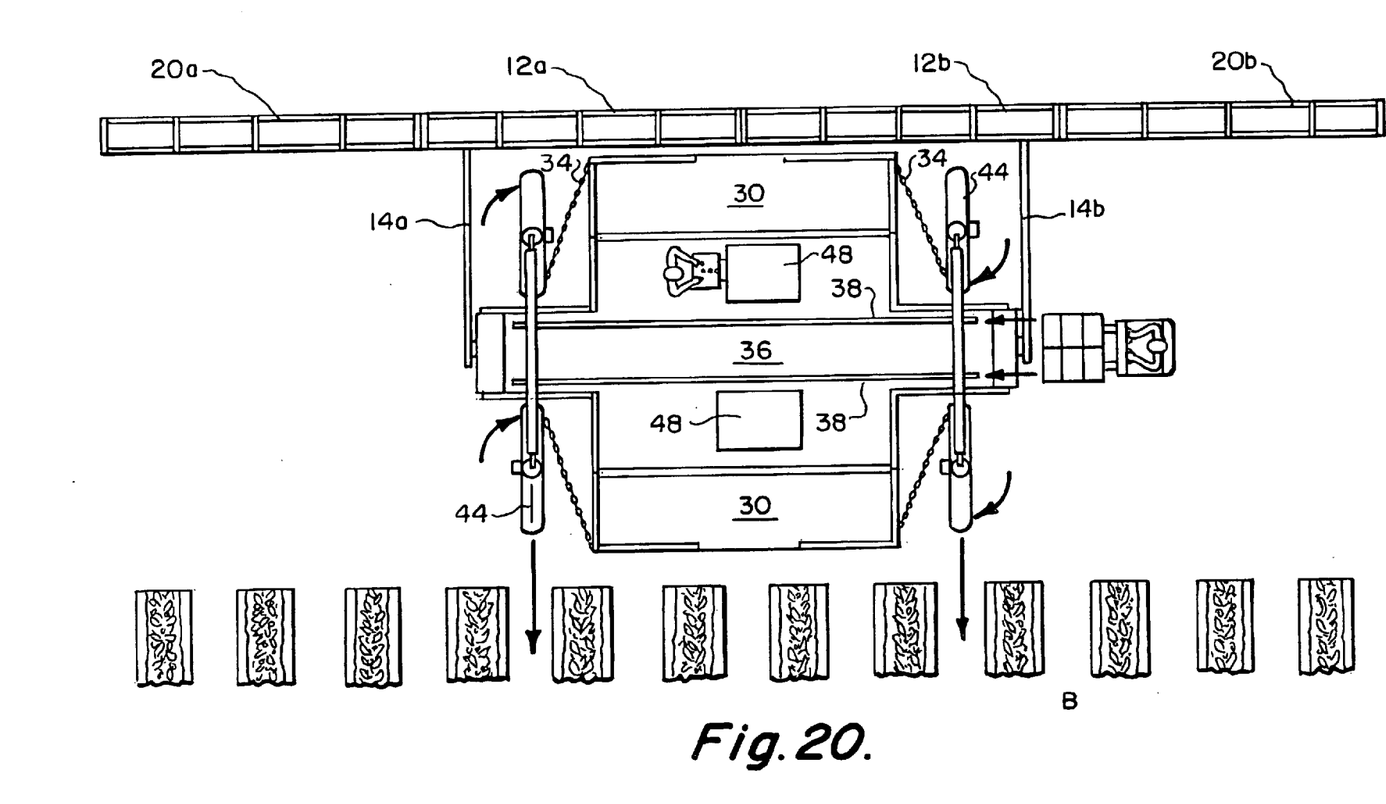
FIG. 20 illustrates the rotation of the tires to align with the field rows for travel across a field.

Once unit 10 has traversed the field, tires 44 are horizontally orientated, typically 90 degrees, for travel along the edge of the field until the conveyor system is substantially aligned with rows of unpicked fruit as shown in FIG. 18. At this juncture, if it becomes desirable to remove palletized fruit, an operator can control the movement of chains 38 from control panel 40 so that the loaded pallets are displaced to the end of unit 10 for removal off the vehicle by forklift D. FIG. 19 illustrates how rotating arms 14 displace the entire conveyor system over the main body of unit 10 until it is on the side of the vehicle opposite the edge of field B. FIG. 20 illustrates the wheels reorientated for traverse back across field B.

Figures 17, 24, 25:
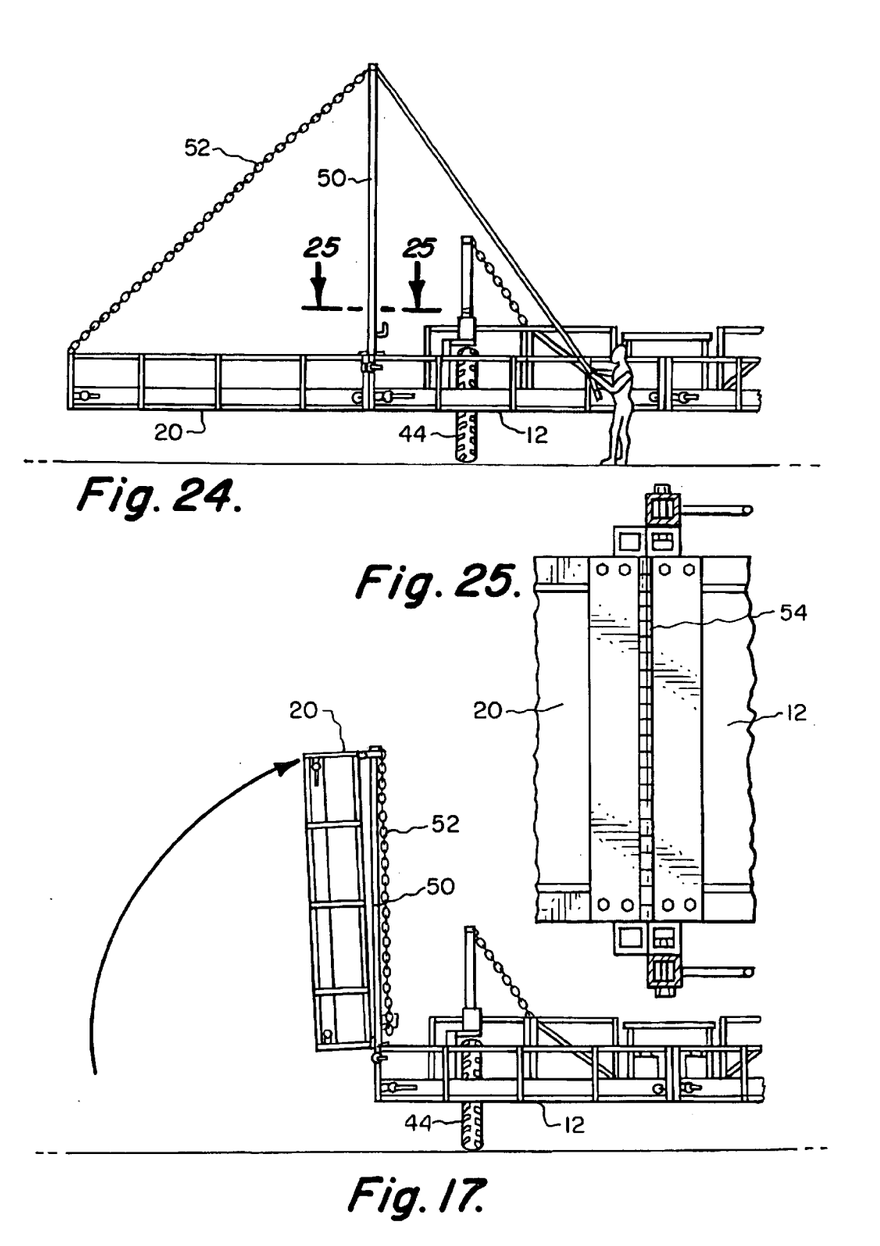
FIG. 17 illustrates the folding of the wing conveyor of the second alternative embodiment illustrated in FIG. 24.
FIG. 24 illustrates a second alternative embodiment for extending a wing conveyor.
FIG. 25 is a view of FIG. 24 taken along line 25—25.

FIGS. 17, 24 and 25 illustrate a third embodiment for connecting a wing conveyor 20 to a conveyor 12 using a mast 50 and chain 52 to raise wing conveyor 20 relative to conveyor 12 along hinge 54.

I claim:

1. A field crop harvesting vehicle for traversing across a field comprising:
   a vehicle body;
   said vehicle body having two work platforms, said areas separated from one another by a pallet conveyor substantially spanning the width of said vehicle body;
   a conveyor belt system comprising a pair of generally horizontal orientated conveyors in linear relationship to one another, each of said conveyors operatively attached to said vehicle body, said conveyor belt system in parallel relationship to said pallet conveyor; and,
   means for arc displacing said conveyor belt system from a first loading position defined as a substantially horizontal position located behind the path of travel of the vehicle over said vehicle body to said second loading position located substantially 180 degrees from said first loading position.

2. The field crop harvesting vehicle of claim 1 wherein said means for arc displacing is a pair of displacement arms, each of said displacement arms being operably connected to the vehicle on respective opposing sides of the vehicle body, each conveyor connected to a respective displacement arm.

3. The field crop harvesting vehicle of claim 1 where said conveyor belt system further comprises a respective elongated trough positioned above a portion of each said conveyor in fixed relation thereto, and a leveling means which maintains the orientation of said elongated troughs above said conveyors as said conveyor belt system is arc displaced from said first loading position to said second loading position.

4. The field crop harvesting vehicle of claim 3 wherein said means for arc displacing is a pair of displacement arms, each of said displacement arms being operably connected to the vehicle on respective opposing sides of the vehicle body, each conveyor connected to a respective displacement arm.

5. The field crop harvesting vehicle of claim 1 further comprising a set of floodlights operatively mounted on said machine to facilitate harvesting operations at night time.

6. The field crop harvesting vehicle of claim 2 further comprising a set of floodlights operatively mounted on said machine to facilitate harvesting operations at night time.

7. The field crop harvesting vehicle of claim 3 further comprising a set of floodlights operatively mounted on said machine to facilitate harvesting operations at night time.

8. The field crop harvesting vehicle of claim 4 further comprising a set of floodlights operatively mounted on said machine to facilitate harvesting operations at night time.

9. The field crop harvesting vehicle of claim 1 further comprising two sets of tires operatively attached to said vehicle to engage the ground surface, one tire set located on one side of said pallet conveyor and the second tire set located on the opposite side of said pallet conveyor, the spacing between each tire of each said tire set being adjustable to adapt said vehicle for operation in fields having different row spacing.

10. The field crop harvesting vehicle of claim 3 further comprising two sets of tires operatively attached to said vehicle to engage the ground surface, one tire set located on one side of said pallet conveyor and the second tire set located on the opposite side of said pallet conveyor, the spacing between each tire of each said tire set being adjustable to adapt said vehicle for operation in fields having different row spacing.

11. The field crop harvesting vehicle of claim 4 further comprising two sets of tires operatively attached to said vehicle to engage the ground surface, one tire set located on one side of said pallet conveyor and the second tire set located on the opposite side of said pallet conveyor, the spacing between each tire of each said tire set being adjustable to adapt said vehicle for operation in fields having different row spacing.

12. The field crop harvesting vehicle of claim 1 further comprising a separate wing conveyor operatively connected to each conveyor.

13. The field crop harvesting vehicle of claim 2 further comprising a separate wing conveyor operatively connected to each conveyor.

14. The field crop harvesting vehicle of claim 4 further comprising a separate wing conveyor operatively connected to each conveyor.

15. The field crop harvesting vehicle of claim 10 further comprising a separate wing conveyor operatively connected to each conveyor.

16. The field crop harvesting vehicle of claim 11 further comprising a separate wing conveyor operatively connected to each conveyor.

* * * * *